Aug. 15, 1972 | I. G. SAYCE | 3,684,667

PRODUCTION OF FLUORINE OR VOLATILE FLUORINE COMPOUNDS USING PLASMA JET ANODE

Filed July 27, 1970 | 2 Sheets-Sheet 1

INVENTORS
IAN GEORGE SAYCE

BY Cushman, Darby & Cushman
ATTORNEYS

INVENTOR
IAN GEORGE SAYCE

By Cushman, Darby & Cushman
ATTORNEYS

United States Patent Office 3,684,667

Patented Aug. 15, 1972

3,684,667

PRODUCTION OF FLUORINE OR VOLATILE FLUORINE COMPOUNDS USING PLASMA JET ANODE

Ian George Sayce, 20 Belvedere Close, Teddington, Middlesex, England

Filed July 27, 1970, Ser. No. 58,581
Claims priority, application Great Britain, Aug. 8, 1969, 39,840/69
Int. Cl. B01k *1/00;* C22d *3/06*
U.S. Cl. 204—60 5 Claims

ABSTRACT OF THE DISCLOSURE

A plasma (i.e. an electrically conducting arc or stream of gas) is used as the anode in the electrolysis of molten fluorides, e.g. calcium fluoride, to give fluorine or volatile fluorine compounds.

Figure 1:
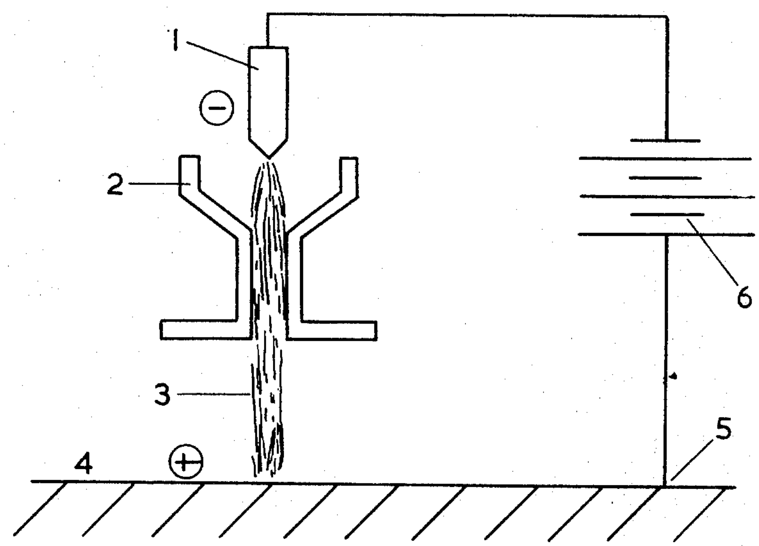

This invention relates to the production of fluorine or volatile fluorine compounds.

The basic naturally occurring source of fluorine compounds is calcium fluoride (fluorspar) $CaF_2$ or its complexes such as apatite $Ca_5(PO_4)_3F$. In practice, the first step in preparing any fluorine compound normally comprises the treatment of calcium fluorine or such a complex with a nonvolatile acid such as sulphuric acid to form hydrogen fluoride, which is then the source of fluorine for other fluorine compounds. For many such compounds, however, hydrogen fluoride is far from ideal as a source of fluorine because reactions involving numerous reaction stages are required to convert it into the desired product.

Thus, for example, tetrafluoroethylene (a monomer required for making the unique plastics material polytetrafluoroethylene and other fluorocarbon polymers) is made from calcium fluoride as follows:

(1) $CaF_2+H_2SO_4 \rightarrow 2HF+CaSO_4$ (2) $2HF+CHCl_3 \rightarrow CHClF_2+2HCl$ (3) $CHClF_2 \rightarrow CF_2+HCl$ $$CF_2+CF_2 \rightarrow C_2F_4$$

($CHCl_3$ is itself obtained in two stages from $CH_3OH$ via $CH_3Cl$ which is reacted with $Cl_2$). Individually, these processes are efficient and operate with high conversions and yields, but the means whereby carbon and fluorine are brought into association as tetrafluoroethylene are very indirect and involve the production of much hydrogen chloride as byproduct; this and the multiplicity of stages make tetrafluoroethylene an expensive chemical.

If some more direct method were available for preparing fluorine or volatile fluorine compounds from calcium fluoride, many fluorine-containing materials might be more readily obtained and become less costly.

It has been proposed in U.S. patent specification 2,835,711 to prepare fluorocarbons by reacting a fluoride of a Group II-A element of the Perodic Table (i.e. Be, Mg, Ca, Sr, Ba, Ra) and carbon at high temperatures, e.g. by subjecting a mixture of calcium fluoride and carbon to the heat of a direct-current carbon arc. Carbon tetrafluoride and calcium carbide were said to be the main products. However, an attempt to repeat this work under the conditions described in the examples of U.S. specification 2,835,711 has given only traces of fluorocarbon products.

According to the present invention fluorine or volatile fluorine compounds are made by the electrolysis of molten fluorides, e.g. calcium fluoride, using a plasma as the anode to give fluorine or volatile fluorine compounds at the anode. A plasma may also conveniently be used as the cathode, but this is not essential and conventional types of cathode can be used. A metal, e.g. calcium, is formed at the cathode and may also be recovered.

The term "plasma" means an electrically conducting arc of stream of gas which may but need not be directionally confined.

The method of the invention can, in principle, be used to electrolyse any molten fluoride, provided that the melt is electrically conducting. It is particularly useful because of the difficulty in finding an electrode material which is chemically unreactive to the material of the melt and to the fluorine or fluorine compounds produced by electrolysis. The plasma electrode is also advantageous where high temperature melts are required, as further sources of heat to melt the electrolyte may be unnecessary if plasmas of high enthalpy are employed.

One useful source of the plasma required for the electrolysis of molten fluorides is a direct-current plasma jet, in which a constricted electric arc is maintained between an axial electrode and a surrounding annular electrode. Gas, passed through this arc, emerges as a jet of partially ionised plasma. This jet is normally turbulent, and travels at high velocity. However, for the present purpose it is more conventient to use a plasma jet in the so-called "laminar mode," where conditions may readily be adjusted (e.g. with a specially designed torch) to generate a jet of plasma which is much longer than the usual plasma jet; it also uses less gas, has lower velocity, has a higher temperature and is thus much more conducting than the more usual turbulent plasma jet. Furthermore, less trouble is observed with splashing of the liquid fluoride melt. The plasma jet electrode may be suitable for heating the electrolyte initially to obtain a melt before being used as a "transferred arc" to pass the electrolytic current.

Figure 2:
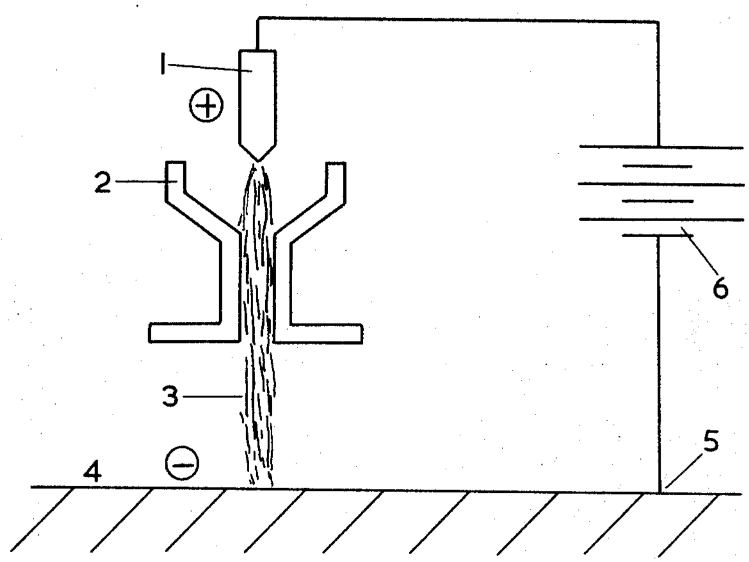

Several different circuits are possible for electrolysis with plasma jets; two simple examples are shown diagrammatically by way of illustration in FIGS. 1 and 2. These figures show the axial torch electrode 1 and the annular electrode 2 of a plasma torch, the plasma 3, acting as an electrode where it touches the fused electrolyte 4, an electrical connexion 5 (i.e. a second electrode for the electrolysis cell in the form of a conducting crucible, a liquid or solid conducting electrode, or a second plasma electrode of the type described herein), and finally a source 6 of direct-current electrical power.

In the circuit of FIG. 1 the plasma electrode shown is the cathode for electrolysis, another plasma also being used for the anode. The plasma jet is first used without transfer of the arc to heat the fluoride electrolyte until it melts and conducts electricity. The connexions are then arranged so that the plasma is negative with respect to the melt and the arc is transferred to the melt from the annular torch electrode. This may be done as shown. The annular electrode of the torch may be maintained electrically floating, or a small pilot arc may still be maintained between the axial and annular electrodes of the torch if desired, e.g. for greater stability of the system. However, the torch will usually be found to operate successfully on the transferred arc alone. Electrons are thus emitted from the axial torch electrode and pass through the plasma to the arc root on the surface of the fluoride electrolyte. Here they enter the electrolyte and neutralise cations just as in conventional electrolysis. The circuit is then completed through a second electrode and a power source. A metal (e.g. calcium from calcium fluoride) is thus formed at this arc root and if the temperature of the melt is above the boiling point of the metal it will distil off and can thus be isolated; meanwhile fluorine atoms are liberated at the anode which for this invention is a second plasma electrode.

In the circuit of FIG. 2 the plasma electrode is the anode for electrolysis. Again the fluoride electrolyte may be fused using the plasma jet without transfer of the arc. The connexions are then arranged so that the plasma becomes positive with respect to the melt. This may be done as shown in FIG. 2 in which the annular electrode of the torch is again electrically floating and the torch runs on the transferred arc alone, or a small pilot arc may be maintained within the torch. Thus fluoride anions of the electrolyte travel to the arc root and there release electrons and fluorine atoms. Under suitable conditions these fluorine atoms combined together to form fluorine ($F_2$) gas or with other reactive chemical species to give volalite fluorine compounds, which are led from the cell. The electrons at the melt surface are then emitted at the arc root and travel up through the plasma to the torch. They then complete the circuit through the power source and the cathode, which in this case need not be another plasma electrode.

These circuits are only examples of a number of circuits which may be used for electrolysis with plasma jets. For instance it may be necessary to bias the annular torch electrode electrically when the plasma jet is either used as cathode or anode for electrolysis, as it is possible otherwise that a double arc may be generated, i.e. electrolyte to annular torch electrode, and annular torch electrode to axial torch electrode, or vice versa. This means that an arc root might be generated on the face of the annular torch electrode which may result in erosion of this part. However, by maintaining a suitable biasing potential on the annular electrode, the tendency to form a double arc can be eliminated.

Furthermore, the plasma jet is only one of many possible examples of a source of plasma for the generation of a gaseous plasma electrode. It may prove particularly convenient to use a simple elctrode of a solid conductor, e.g. metal or carbon, which may even be consumed in the process of acting as a plasma anode so as to form volatile fluorine compounds. An arc is then struck between the molten fluoride electrolyte and this electrode.

Another possible source of plasma is the transpiration-cooled electrode which is now commercially available and which could make a useful non-consumable anode. An annular transpiration-cooled anode coupled with an axial tungsten cathode forms a transpiration-cooled plasma generator which may be used in the invention instead of a conventional plasma torch.

In some of these cases it may be necessary to employ an additional source of heat to obtain initial fusion of the fluoride electrolyte and possibly to supplement the heat supplied by the arc and the process of electrolysis. Such additional sources of heat may for example be plasma jets or electrical resistance or induction heating devices.

In this invention, a plasma may be used as the anode in electrolysis of the molten fluoride in conjunction with a second electrode of conventional design, or two plasma electrodes may be used together, one acting as anode, the second as cathode. Thus the metal (e.g. calcium) as well as the fluorine may be produced at a plasma electrode. Also, as in Example 3 below, the atomic fluorine produced in electrolysis at high temperatures may be especially suitable for certain types of reaction which may take place in situ. For instance, the fluorine may be caused to react with a gas, or mixture of gases, which may be introduced as a plasma-forming gas (instead of an inert gas such as argon which is usually used), or which may be introduced separately. Alternatively, the fluorine may be caused to react in the cell with a solid or liquid introduced for this purpose. In the case of a solid this could act as the electrode used to generate the plasma arc (as in Example 3). Finally, a combination of the above methods might be used, for instance in the production of chlorofluorocarbons.

Figure 3:
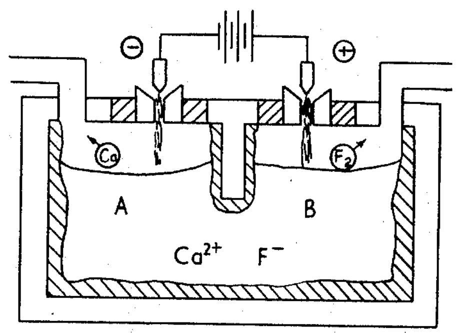
Figure 4:
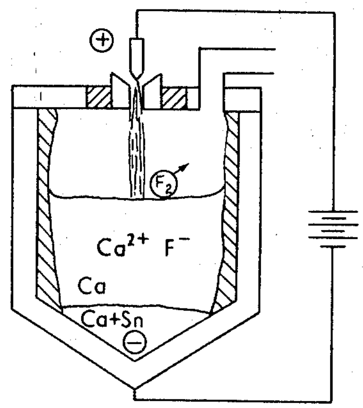
Figure 5:
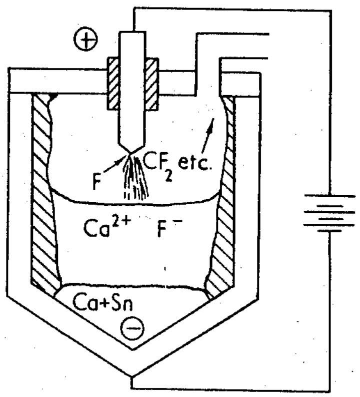

The invention is further illustrated by the following examples and FIGS. 3, 4 and 5 of the drawings.

EXAMPLE 1

FIG. 3 shows a cell with two gaseous plasma electrodes, used for example in the electrolysis of calcium fluoride. The fluoride is contained in a water-cooled scull type of crucible having two separate compartments, which are both gastight but have facilities to remove gas and a partition which is supported by a crucible cover which also provides support for the plasma torches and insulates them from the crucible. The inner surfaces are coated with an insulating layer of solid calcium fluoride, which encompasses a pool of fused calcium fluoride. These two compartments form the two half cells of the electrolysis apparatus. They are first heated using two plasma jets connected to a direct-current source and running on inert gas (e.g. argon) preferably in the high enthalpy laminar mode, the arcs being of the non-transferred type. When the fluoride has melted sufficiently the two half cells become connected by a layer of fused electrolyte. At this stage the electrical connexions are arranged as shown so that electrolysis occurs. If desired, some power may still be dissipated in each of the plasma jets, but with suitable design this may be reduced to zero so that the two torches run solely on the transferred arcs.

Electrons emitted by the axial electrode of the torch in half cell A travel down through the plasma to the arc root on the surface of the melt. There they neutralise $Ca^{2+}$ ions and metallic calcium forms. At the temperature of the melt calcium distils off and is carried in the argon stream out of the cell when it may be condensed to a liquid or solid by suitable apparatus.

The electric current is carried through the melt by the usual process of ionic transport and in half cell B the electrolyte becomes cathodic to the plasma jet. Fluoride ions at the arc root release electrons and form fluorine gas which is led from the cell and collected by suitable apparatus. The electrons emitted at the arc root then travel up the plasma to the axial electrode of the second torch and thence to the power supply, so completing the circuit.

EXAMPLE 2

The use of only one plasma electrode to electrolyse a calcium fluoride melt is shown in FIG. 4. The cell is a carbon crucible or other suitable container at the bottom of which is a pool of liquid metal (e.g. tin) which acts as cathode for the electrolysis. The electrolyte is calcium fluoride which is molten at the centre of the cell but solid (and insulating) where it comes in contact with the cell walls. The lid of the cell supports a plasma jet but insulates it electrically from the crucible. The torch is used to melt the electrolyte and a potential difference is then applied as shown so that the liquid tin is cathodic and the axial torch electrode becomes anodic to the electrolyte. Calcium is formed at the cathode, where it dissolves in the liquid tin, while fluorine is released at the arc root and passes out of the cell.

In one experiment using an argon plasma an arc was established to molten calcium fluoride with a potential of 190 volts and an electrolysis current of 5.5 amperes. (It was also possible to operate at lower voltages and higher currents.) The evolved gases were passed through sodium hydroxide solution and analysis showed that 38.6 mg. of fluorine was produced in 3 minutes.

EXAMPLE 3

The plasma jet may be replaced by a consumable carbon electrode, and when the desired product of the electrolysis of calcium fluoride is not fluorine, but the high-temperature carbon-fluorine species which are of interest to fluorocarbon chemists, this apparatus may be more convenient. Such a cell is shown schematically in FIG. 5. It may be heated by a variety of means to obtain initial fusion of the melt (e.g. plasma jet, or resistance or inductive heating), but thereafter the arc once initiated will maintain the temperature. In this cell the cathode is again a liquid metal (e.g. tin), and calcium liberated here dissolves to form an alloy. At the arc root fluorine atoms are liberated and at the high temperature of the arc these react with carbon from the electrode to form $CF_2$ and similar high-temperature carbon species in the form of a gas which may be withdrawn from the cell. The carbon electrode is fed continuously into the cell to maintain a constant arc length. The product gas may be slowly cooled, in which case carbon tetrafluoride and perfluoroethane are the predominant gaseous species. Alternatively the product may be rapidly quenched when tetrafluoroethylene is a major constituent of the gas. Operation under reduced pressure may be employed to increase the effective quench rate.

In one experiment an arc was established with a potential of 140 volts and a current of 90 amperes. The gas evolved was filtered to remove solids and then passed through the cell of an infra-red spectrophotometer. Peaks were observed corresponding to carbon tetrafluoride, perfluoroethane and silicon tetrafluoride. The last arose from attack by gaseous products on silica parts of the apparatus. The yield of carbon tetrafluoride was about 20 mg./minute.

I claim:

1. A method for the production of fluorine or volatile fluorine compounds comprising the electrolysis of an electrolyte consisting of molten fluorides using a plasma as the anode.

2. A method according to claim 1 in which the source of the plasma required for the electrolysis is a direct-current plasma jet.

3. A method according to claim 1 in which the source of the plasma is an arc struck between the molten fluoride electrolyte and an electrode of solid conductor.

4. A method according to claim 3 in which the electrode is of carbon.

5. A method according to claim 1 in which the electrolyte consists of calcium fluoride.

References Cited

UNITED STATES PATENTS

| | | | |
|---|---|---|---|
| 3,114,684 | 12/1963 | Olstowski et al. | 204—60 X |
| 3,147,329 | 9/1964 | Gage | 75—10 R |
| 3,324,016 | 6/1967 | Langer | 204—60 |
| 3,533,777 | 10/1970 | McTaggart | 75—10 R |
| 3,203,883 | 8/1965 | Ototani et al. | 204—140 |
| 3,586,613 | 6/1971 | Stewart | 204—64 R X |

JOHN H. MACK, Primary Examiner

D. R. VALENTINE, Assistant Examiner

U.S. Cl. X.R.

75—10; 204—61, 62, 69, 71, 140